May 10, 1949.　　　R. J. WISE ET AL　　　2,469,423
FACSIMILE APPARATUS

Filed Aug. 14, 1942　　　　　　　　　　　　6 Sheets-Sheet 1

INVENTORS
R. J. WISE
R. D. PARROTT
BY
ATTORNEY

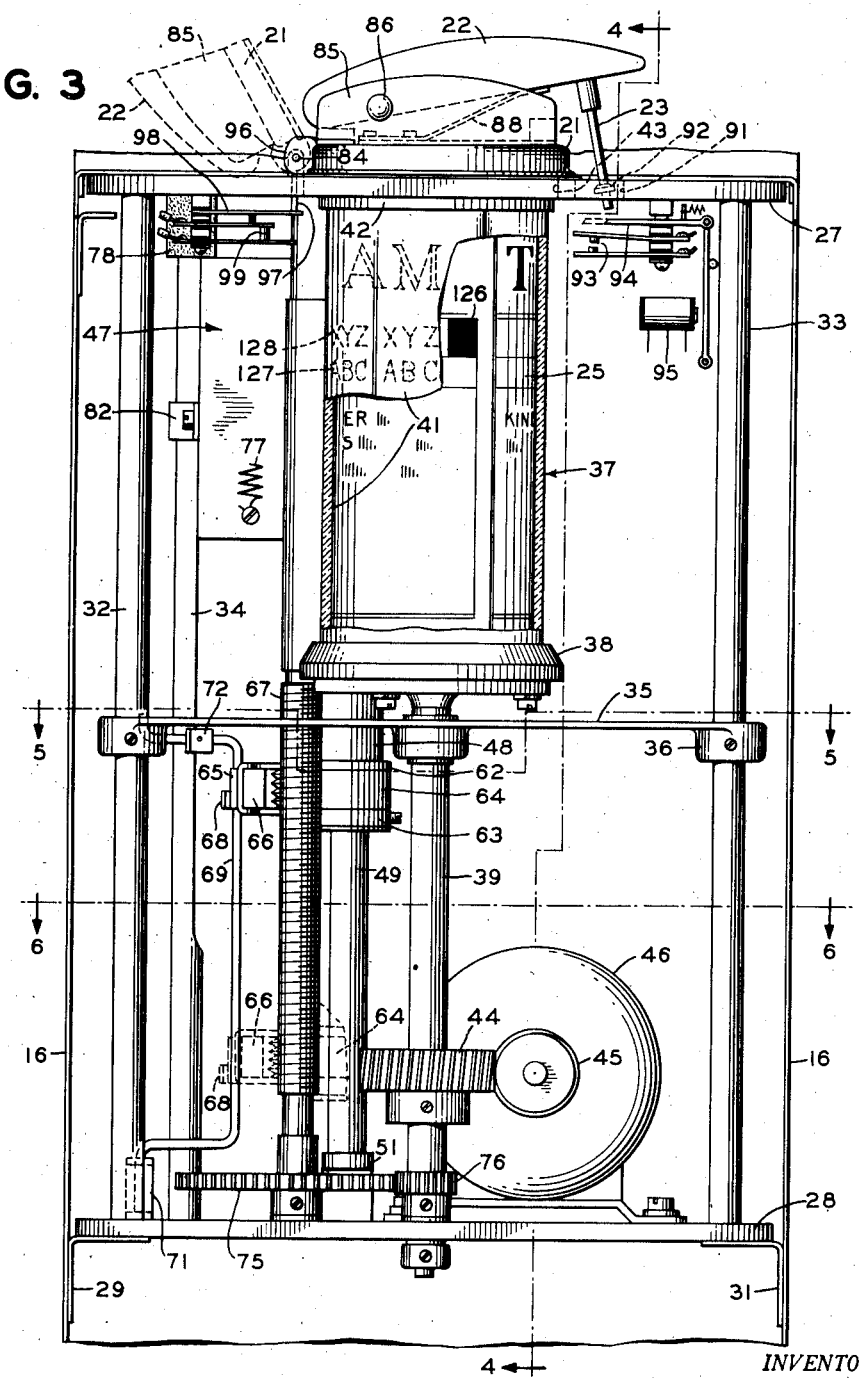

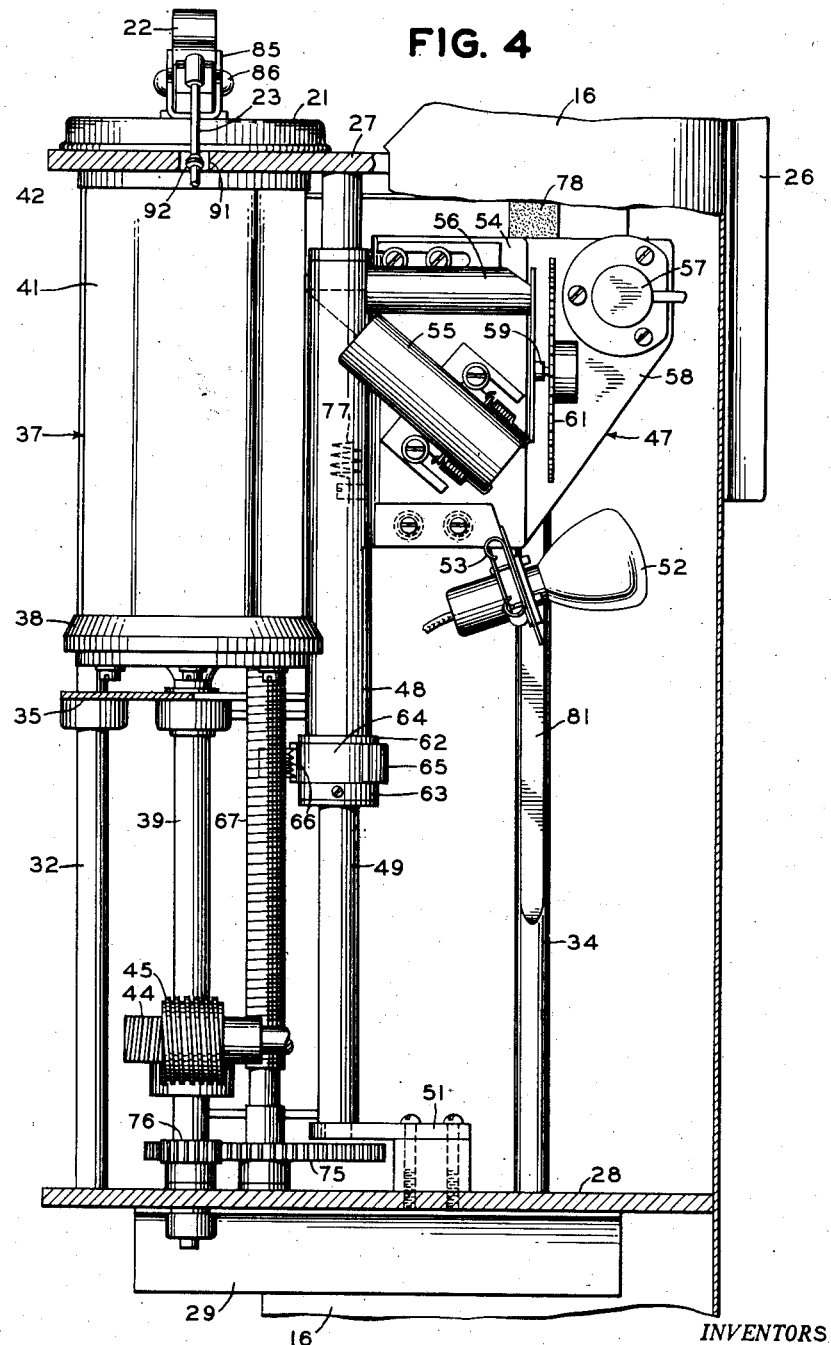

INVENTORS
R. J. WISE
R. D. PARROTT

May 10, 1949.  R. J. WISE ET AL  2,469,423
FACSIMILE APPARATUS
Filed Aug. 14, 1942  6 Sheets-Sheet 5

INVENTORS
R. J. WISE
R. D. PARROTT
BY
*W. H. Sprigg*
ATTORNEY

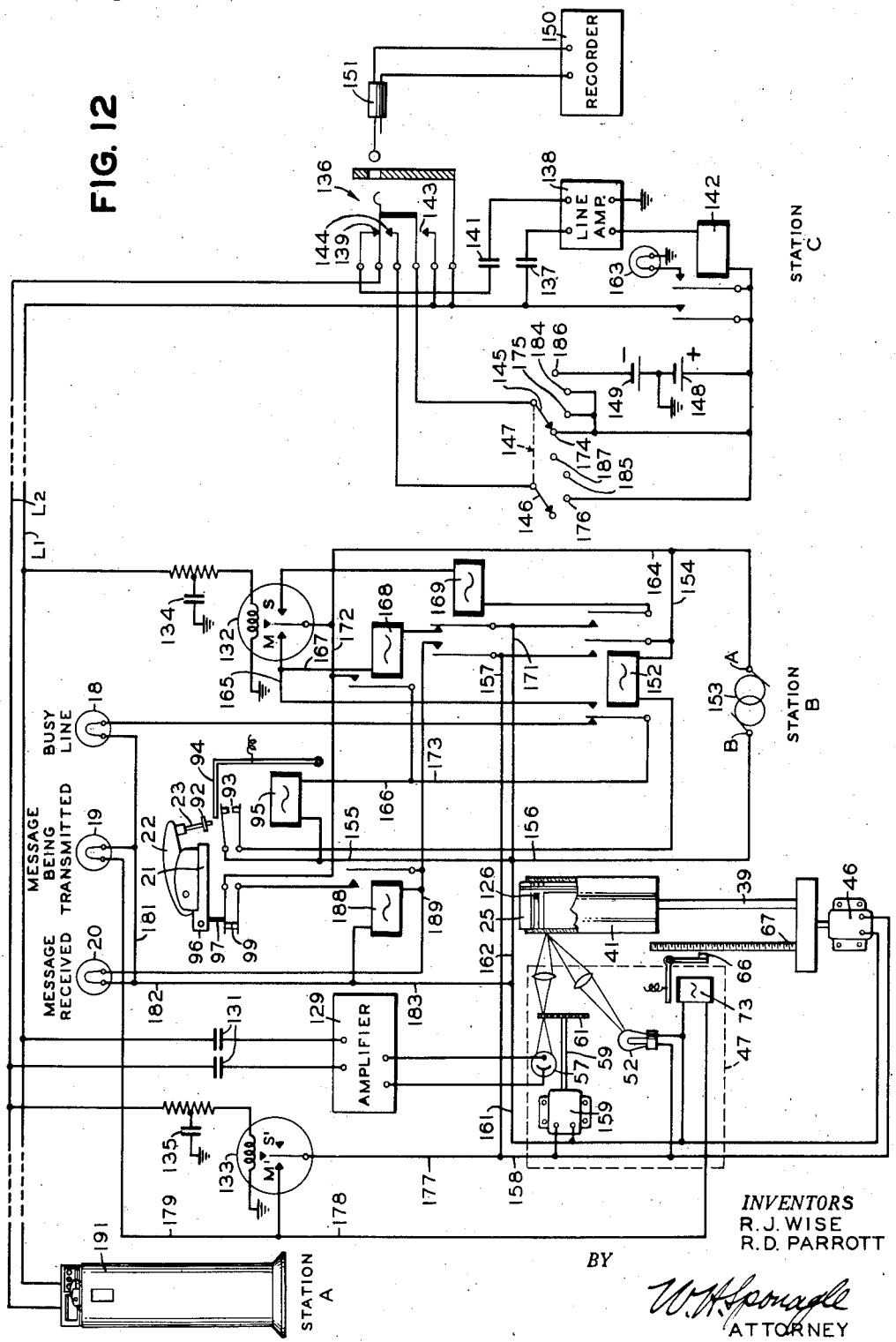

Patented May 10, 1949

2,469,423

UNITED STATES PATENT OFFICE 2,469,423

FACSIMILE APPARATUS

Raleigh J. Wise, Dunellen, and Robert D. Parrott, West New York, N. J., assignors to The Western Union Telegraph Company, New York, N. Y., a corporation of New York Application August 14, 1942, Serial No. 454,768

13 Claims. (Cl. 178—7.1)

This invention relates to facsimile systems, and has particular reference to apparatus employed for the mounting and supporting of a flexible sheet for scanning purposes.

In order that the advantages of facsimile communication be made available as widely as possible, it is necessary to provide scanning apparatus which is relatively simple. In this manner such apparatus may be operated by persons who are not especially trained for the purpose. One drawback to the general use of prior art apparatus is that some degree of skill is usually required on the part of the operator. In apparatus where attempts have been made to minimize the degree of skill required by the operator relatively complex mechanisms have been devised. Obviously, it is desirable to limit, insofar as it is practicable to do so, the additional mechanical complications.

Accordingly, it is the principal object of the present invention to provide a relatively simple and novel facsimile scanner for operation by an unskilled person.

Another object of the invention is to provide novel means for securing a flexible sheet to a cylinder for scanning purposes.

Still another object of the invention is to provide expansible means for supporting a flexible sheet on the inside of a hollow cylinder or tubular member.

A further object of the invention is to provide for the securing of a flexible sheet to the inside of a hollow cylinder by means of an expansible helical member.

A still further object of the invention is to provide for the securing of a flexible sheet to the inside of a hollow cylinder by means of a plurality of centrifugally actuated members.

An additional object to the invention is to provide a facsimile machine with a novel cover for the scanner, the cover having means for being releasably locked in a closed position.

Another object of the invention is to provide, in a facsimile machine, novel means for actuating contacts by the movement thereof to intercept and stop a normally moving operating member.

Another object of the invention is to provide means for inscribing on a cylinder identifying marks in a position to be scanned in frame with the subject matter of a sheet supported by the cylinder where the framing is controlled by a predetermined portion of the sheet, irrespective of the position of the sheet in the cylinder.

These and other subsidiary objects of the invention are embodied in two modifications which will be described in connection with the accompanying drawings, of which:

Fig. 3 is a front view of the novel facsimile transmitter with the cover removed;

Fig. 4 is a sectional view of the apparatus taken on the line 4—4 of Fig. 3;

Figure 7:
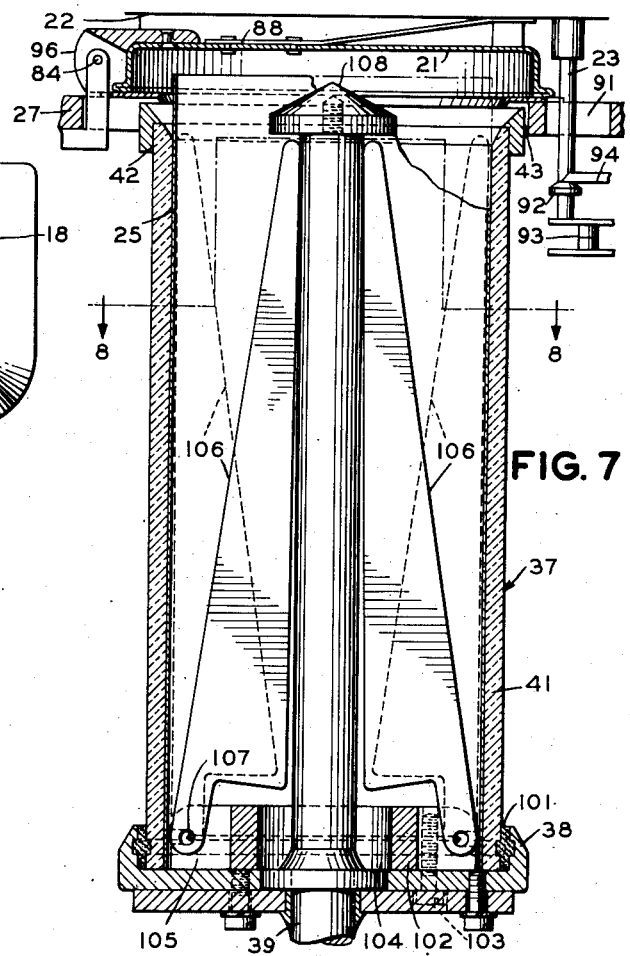
Figure 8:
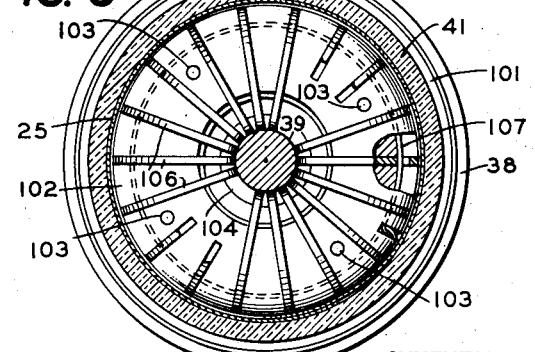
Figure 5:
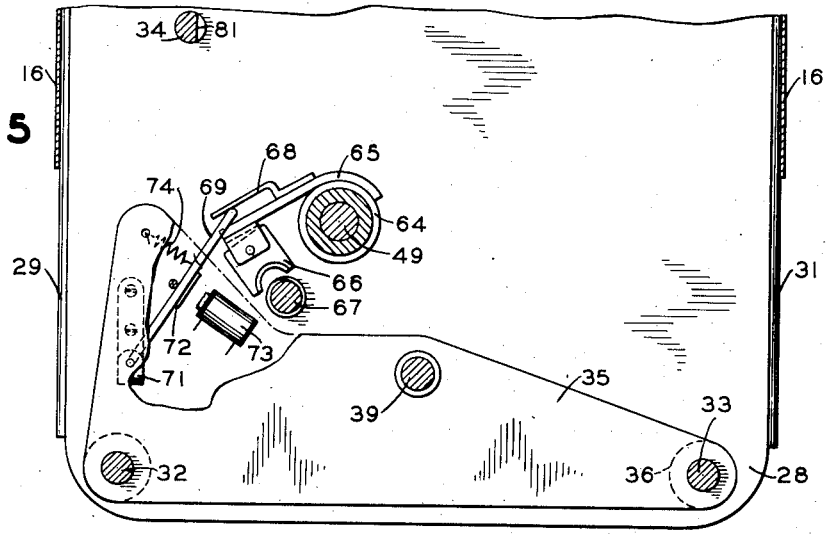
Figure 6:
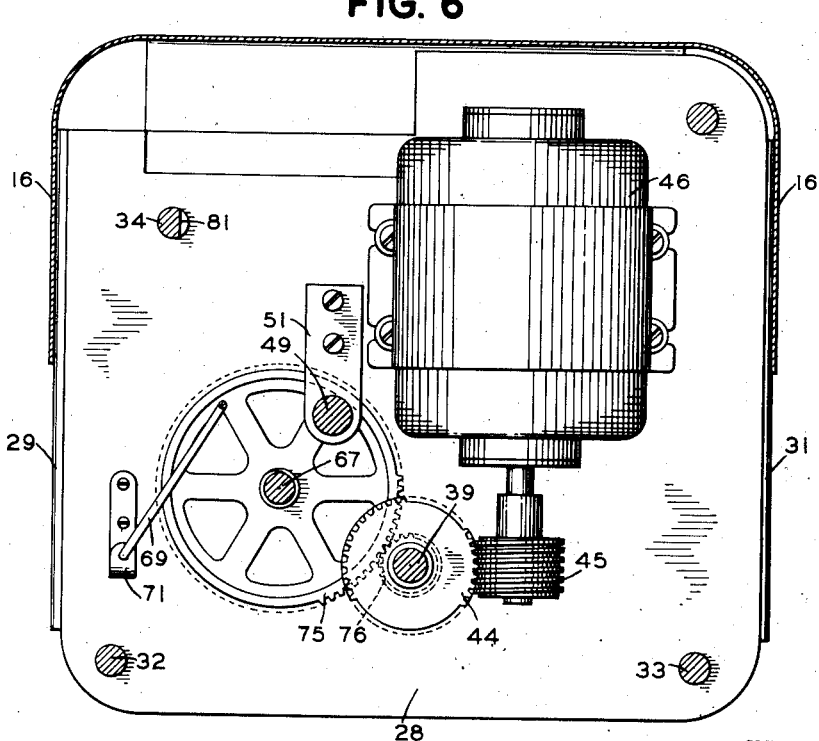
Figure 9:
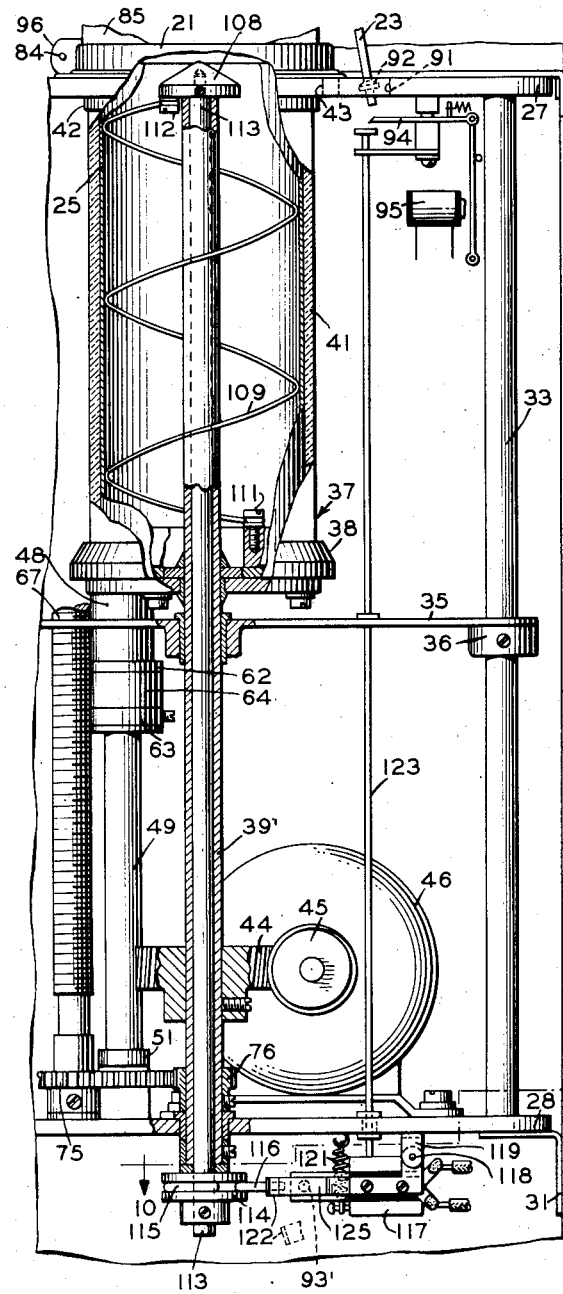
Figure 11:
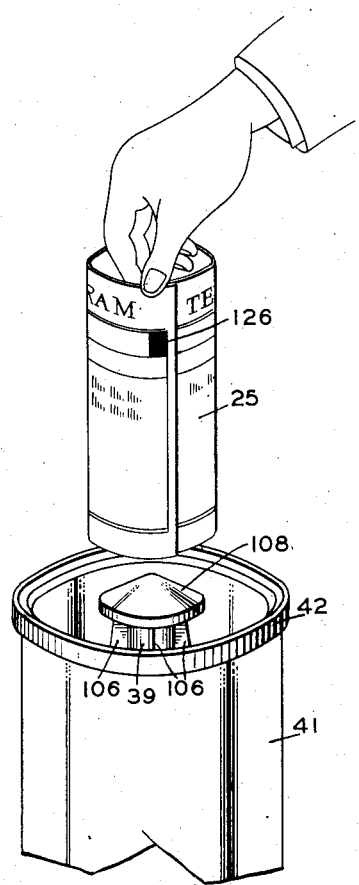
Figure 10:
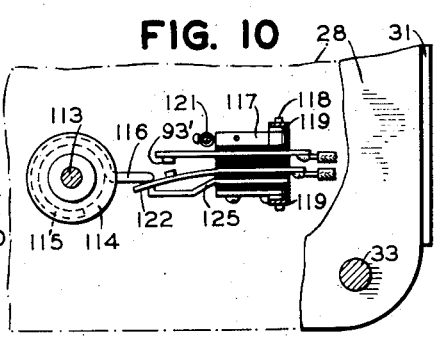

Figs. 5 and 6 are horizontal sectional views taken respectively on the lines 5—5 and 6—6 of Fig. 3;

Fig. 7 is a sectional view to an enlarged scale of the form of sheet mounting device shown in Fig. 3;

Fig. 8 is a horizontal sectional view of the sheet supporting cylinder taken on the line 8—8 of Fig. 7;

Fig. 9 is a partial front elevation and sectional view of a modification of the sheet mounting apparatus and the control mechanism therefor;

Fig. 10 is a fragmentary sectional view taken on the line 10—10 of Fig. 9;

Fig. 11 illustrates the manner of forming the sheet for insertion in the supporting cylinder; and Fig. 12 is a schematic circuit diagram showing one way of controlling the operation of the facsimile transmitter.

The invention is embodied in a machine which is designed so that it may be used in any business office or similar place. The sheet bearing the subject matter to be transmitted, after being roughly formed into a loose roll, is inserted through the top of the machine into a rotatable hollow transparent cylinder or tubular member. A cover is moved to close the opening, and a handle attached to the cover is actuated to start the machine whereby to transmit a signal to the recording station. The handle is then locked in this position for the duration of the scanning operation so that it is impossible to open the cover. As soon as the machine is put into operation, expansible means within the hollow cylinder operate to press the sheet firmly against the inside of the cylinder wall. A carriage, upon which is mounted optical scanning apparatus, is then moved longitudinally of the rotating cylinder whereby a helical scanning of the subject matter on the blank is effected. Following the scanning operation the cover handle is unlocked so that the cover may be moved to again provide access to the inside of the cylinder, which at this time is no longer rotating. The expansible means within the cylinder is also withdrawn from engagement with the sheet so that it may be moved and replaced by another, if desired, and the entire sequence repeated.

In one embodiment of the invention the expansible means within the hollow cylinder comprises a plurality of pivoted members so formed that, when the cylinder is at rest, they are moved to the central portion thereof under the influence of gravity. Upon rotation of the cylinder the pivoted members are thrown outwardly into engagement with the sheet within the cylinder by the centrifugal force generated by the revolving cylinder.

In another embodiment of the invention the expansible means comprises a helical spring-like member mounted within the hollow cylinder and connected to mechanism whereby, when the cylinder is at rest, the helical member is wound tightly about a spindle extending through the cylinder substantially coaxially therewith. This helical member is tensioned in such a manner that, when the cylinder is released for rotation, the helical member unwinds from the spindle until it presses the paper against the inside of the cylinder wall.

Figure 2:
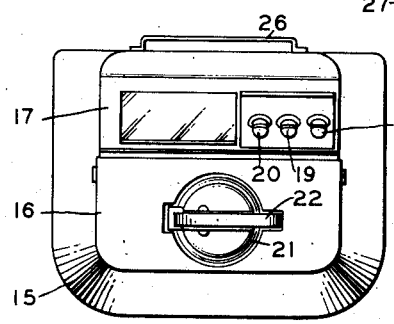
Fig. 2 is a top or plan view of the exterior of the apparatus.
Figure 1:
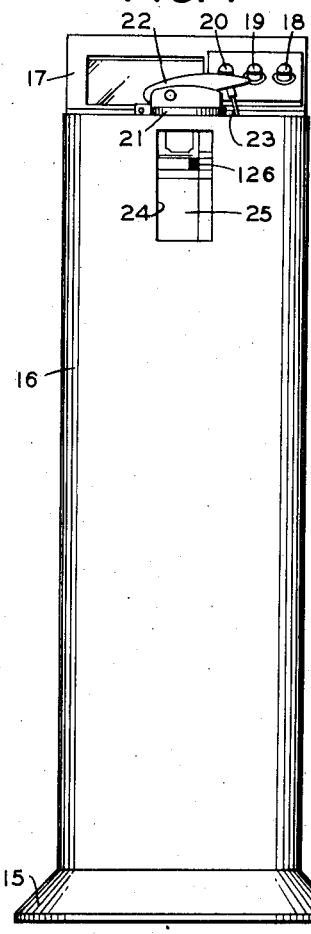
Fig. 1 is a front elevational view of the exterior of a facsimile transmitter embodying the invention.

The detailed descriptions of what are considered at present as preferred embodiments of the invention will be given in connection with the accompanying drawings. Figs. 1 and 2 illustrate the general exterior form of the apparatus. The machine is supported by a base 15 from which there extends upwardly the cover or casing 16. Mounted on the top of the machine toward the rear is a sloping panel 17 which is employed to display, among other things, a plurality of lights 18, 19 and 20. Toward the front of the top of the machine is an opening (not shown in these figures) leading into a transparent hollow cylinder or tubular member. The opening is normally closed by a cover 21 which is provided with a handle 22 pivoted thereon so that it may be depressed when the cover is in its closed position to move a handle rod or switch operating member 23, by means of which the machine is started. Formed in the front of the cover 16 is a window 24, through which may be viewed the transparent cylinder and a sheet 25 mounted therein. There may also be provided, in any suitable location, such as at the back of the machine, a pocket 26 for sheets to be used with the machine.

Having reference to Figs. 3 and 4, the sheet mounting and scanning apparatus will be described in greater detail. This apparatus is supported between an upper plate 27 and a lower plate 28 in the upper part of the machine housing. The lower part of the housing is used for the auxiliary apparatus, such as a power pack, amplifier, control relays, etc. The lower plate 28 is attached by means of angle irons 29 and 31 to the casing 16. The upper plate 27 is supported by the lower plate and spaced therefrom by rods such as 32, 33 and 34. An intermediate bearing plate 35 has formed adjacent the edges thereof a plurality of bosses such as 36, by means of which the bearing plate is attached to the rods 32 and 33.

The apparatus 37 in which the subject matter bearing sheet is supported for scanning comprises a base 38 secured to a shaft 39 and also a transparent hollow cylindrical or tubular section 41 extending upwardly from the base. The transparent cylinder wall may be made of glass or any equivalent material such as a transparent plastic. The top of the transparent cylinder 41 is capped by a ferrule 42 which is free to rotate in an opening 43 formed in the upper plate 27. There is no connection between the ferrule and the plate 27.

The shaft 39, upon which is supported the apparatus 37, is journaled in the bearing plate 35 and the lower plate 28. Secured to this shaft is a worm wheel 44 which meshes with a worm 45 mounted on the shaft of a driving motor 46. This linkage serves to rotate the sheet mounting apparatus 37 upon operation of the motor 46.

The optical scanning apparatus is mounted on a carriage 47, which is best illustrated in Fig. 4, and is characterized generally by the configuration of a channel. The web portion of the channel-shaped carriage is attached to an elongated sleeve member 48 which is adapted for vertical sliding movement on a guide rod 49. This rod is supported at its upper end in the plate 27 and at its lower end in a bracket 51 which is mounted in spaced relation above the plate 28. A lamp 52 is mounted in a bracket 53 which is attached to one side or flange 54 of the carriage 47. Light from the lamp is directed by a condensing lens tube 55, also mounted on the flange 54, so that a small spot of light is focused upon a subject matter bearing sheet mounted within the transparent cylinder 41. Light which is reflected from the surface of the sheet is directed by a pickup lens tube 56, also mounted on the flange 54, onto the responsive element of a photoelectric tube 57 which is mounted on the other flange 58 of the carriage 47. Supported between the two flanges of the carriage is a small electric motor (not shown), upon the shaft 59 of which is carried a light chopper disc 61 which is provided adjacent its periphery with a series of notches. The disc is positioned with respect to the reflected pencil of light so that, upon rotation, the light which is directed toward the photoelectric tube 57 is periodically interrupted to produce in the output circuit of the photoelectric tube a series of unidirectional impulses, the amplitude of which represents the tonal value of the elemental areas of the subject matter being scanned.

The sleeve member 48 is provided adjacent its lower extremity with two spaced collars 62 and 63, between which there is supported a ring-like member 64. The ring 64 is free to rotate about the axis of the member 48 and carries an arm 65, best illustrated in Fig. 5. Mounted on the arm 65 is a half-nut 66 which is adapted for engagement with a feed screw 67. Also mounted on the arm 65 is an angular member 68 which, at one end thereof, is spaced from the arm so as to form a fork. A bail member 69, which is pivoted in the bearing plate 35 and in a bracket 71 mounted on the upper surface of the lower plate 28, has a vertical portion, best illustrated in Fig. 3, which is engaged by the fork formed by the arm 65 and the angular member 68. The bail also carries an armature 72, by means of which it is moved under the control of an electromagnet 73 attached to any convenient stationary member, such as the bearing plate 35. When the bail 69 is moved by the energization of the electromagnet 73 against the spring 74, the half-nut 66 is brought into engagement with the feed screw 67.

The feed screw is journaled for rotation in the plates 27 and 28 and has attached adjacent the lower end thereof a gear 75 which is meshed with a gear 76 attached to the shaft 39. Upon operation of the motor 46, the feed screw 67 is rotated at a predetermined speed so that, when it is engaged by the half-nut 66, the carriage 47 is moved downward for scanning purposes at a pre-arranged rate.

Upon completion of a scanning operation, the half-nut is disengaged from the feed screw, and the carriage is returned to its upper position, as illustrated, by means of a spring 77 or other suitable retractive force. The spring is attached at one end to the carriage and at the other end (not shown) to any other convenient stationary member, such as the upper plate 27. A rubber or other suitable shock absorbing stop 78 is attached to the upper plate 27 in a position to be struck by the carriage 47 when it is returned to its normal idle position.

The rod 34 extending between the upper and lower plates 27 and 28, respectively, is milled or otherwise flattened along a considerable portion thereof, such as at 81. The flange 58 of the carriage 47 slides on the flattened portion 81 as the carriage is moved vertically and is held in contact therewith by means of a U-shaped strap 82 attached to the flange and encircling the rod 34.

The cover 21 which is hinged at 84 is adapted to close the opening 43 in the upper plate 27 when in the position illustrated by the solid lines of Fig. 3 and, when moved to the position shown in the dotted lines, affords access to the interior of the transparent cylinder 41. A channel member 85 is attached to the top of the cover 83, and pivoted therein at 86 is the handle 22. The handle is normally held in the position shown by a flat spring 88. Adjacent the free end of the handle is the depending rod or switch operating member 23 which extends through an opening 91 formed in the upper plate 27. A collar 92 is formed adjacent the lower extremity of the rod 23 for a purpose to be described. When the cover 21 is in its closed position, a downward movement of the handle 22 brings the lower end of the rod 23 into position to close a pair of contacts 93 which are used for a control purpose to be described. With the handle in such an operated position, a forked member 94 may be moved to the left, as viewed in Fig. 3, by the energization of an electromagnet 95 and slipped over the top of the collar 92 so that the handle is retained in this position (Fig. 7). If the electromagnet 95 is energized before the handle is depressed, the forked member 94 is in a position to intercept the collar 92 before the rod 23 can be moved sufficiently to close the contacts 93.

The cover 21 has formed therein adjacent the hinge 84 a cam surface 96. A cam follower 97 is supported by a spring 98 for the purpose of operating a pair of contacts 99. The cam surface 96 is so shaped that, when the cover 21 is in its closed position as shown, the operating member 98 is in its lower position to close the contacts 99. When the cover 21 is moved to the position shown by the dotted lines, the cam follower 97 is permitted to move upwardly and to thereby open the contacts 99.

The supporting structures for the contacts 93 and 99 may be attached to any convenient stationary structure, such as the upper plate 27. Also, the electromagnet 95 may be similarly mounted.

Having particular reference to Figs. 7 and 8, the details of one form of the invention for holding a sheet within the transparent cylinder for scanning are shown. The transparent cylinder 41 is held in the base 38 by means of cement 101 or other equivalent material. On the inside of the cylinder a spider 102 is secured to the base 38 by means of a plurality of screws such as 103. The spider 102 is provided with a circular opening 104 to allow the shaft 39 to extend upwardly to the top of the cylinder. Adjacent the periphery thereof the spider is also provided with a plurality of radial slots such as 105. A plurality of upwardly extending arms or blades such as 106 is mounted in each of the spider slots and is arranged to be pivoted freely therein. A wire 107 or other suitable means is threaded through transverse holes formed in the walls of the spider slots and depending lugs of the arms such as 106 and forms the pivot for the arms. Each of the arms has a generally triangular configuration, and the pivot point is chosen so that the center of gravity of the arm is disposed toward the shaft 39 with reference to the pivot 107. Consequently, when the cylinder 41 is at rest, the arms take up the positions shown in solid lines in Fig. 7 under the influence of gravity. When the cylinder 41 is rotated at a sufficient speed, the centrifugal force acting upon the arms overcomes the pull of gravity, and the arms are moved outwardly from the shaft 39 and take up the positions shown by the dotted lines in this figure.

A dome-like cap 108 is secured to the upper end of the shaft 39, and, when the cylinder is at rest and the arms are in their central positions, the upper ends thereof lie beneath the cap. Consequently, there is no possibility of inserting a sheet in the cylinder in such a manner that any of the arms is disturbed.

In Fig. 11 the manipulation necessary to insert a sheet in the cylinder is shown. The sheet 25 is roughly formed into a loose roll as shown and placed within the cylinder until the lower edge of the sheet reaches the bottom of the cylinder. It is not even necessary to retain the illustrated grasp of the sheet until this operation is completed for the reason that, once the sheet is well within the cylinder, its roll form is retained by the cylinder itself. The insertion operation may then be completed simply by pressing with the palm of the hand upon the upper edge of the sheet until it is completely within the cylinder.

Another modification of the novel sheet securing means is disclosed in Fig. 9. In this case the shaft 39' is hollow and, as in the other form, is secured to the base 38 of the cylinder 41 so that, upon rotation of the shaft, the cylinder is also rotated. A retaining member 109 in the form of a wire having resilient properties is placed within the cylinder in the form of a helix. One end of the helical wire is attached by means of a screw 111 to the base of the cylinder, and the other end is attached by means of a screw 112 to the protecting cap 108. In this case the cap 108 is secured to a shaft 113 which is mounted inside the hollow shaft 39' and is free to rotate therein. The lower end of the shaft 113 extends beyond the end of the hollow shaft 39' and has secured thereto a peripherally grooved collar 114. Mounted within the groove of the collar is a circularly formed member 115, one end of which is bent outwardly to form stop arm 116. The circular member 115 is not rigidly secured to the collar 114, but it is arranged so that there is considerable friction between these members.

A contact structure 117 is pivoted at 118 on a bracket 119 which is mounted on the underside of the lower plate 28. The contact structure is normally urged by a spring 121 toward the position shown in Fig. 9. In this position one of the contact springs 122 is in position to intercept the stop arm 116 mounted on the shaft 113. The contact structure 117, however, is adapted to be pivoted counterclockwise as viewed in Fig. 9 so that the contact spring 122 takes the position shown in broken lines and allows the stop arm 116 to rotate unimpeded. A rod 123 extends from the contact structure 117 to a point adjacent the underside of the upper plate 27. When the handle attached to the cover is depressed to move the arm 23 downward, instead of this member closing a contact directly as in the other form of the invention, it actuates the rod 123 to pivot the contact structure 117 and thereby release the stop arm 116.

When the contact spring 122 is in the dotted position, it is no longer acted upon by the stop arm 116, and the contacts 93' (Fig. 10) are permitted to close. As described hereinafter, the closure of these contacts results in the operation of the motor 46 to rotate the cylinder 41 and to drive the scanning apparatus. As soon as the stop arm 116 is freed from the restraint of the contact spring 122, the resiliency of the wire 109 is such that the shaft 113 is rapidly rotated within the shaft 39' until the wire takes the form shown in the drawing, in which position the sheet is held in contact with the inside of the transparent cylinder 41. Upon completion of the scanning operation, the handle rod 23 is released, thereby allowing the contact structure 117 to be moved to the position shown. The stop arm 116 is then intercepted by the contact spring 122 and thereby stops the shaft 113; but since the shaft 39' is still rotating while the upper end of the wire 109 is held stationary, the lower end continues to revolve about the shaft 113. The wire 109, therefore, is wound upon the cylinder shaft and consequently is withdrawn from its sheet holding position. The friction between the circular member 115 and the collar 114 is sufficient to permit this operation to be performed. Also, the spring 122 is of sufficient stiffness to maintain the contacts 93' closed. However, as soon as the wire 109 is tightly wound upon the cylinder shaft, there is in effect a non-yielding driving connection between the shaft 39' and the shaft 113, and the latter is rotated sufficiently to open the contacts 93'. Further movement of the stop arm 116 is prevented by the engagement of the contact spring 122 with a back stop 125. The opening of the contacts results in the disconnection of power from the motor 46, but since there is a slight overrunning thereof, the shaft 113 does not stop immediately. However, because of the yielding frictional connection between the collar 114 and the circular member 115, the stop arm 116 is not moved any further.

In using apparatus in accordance with the instant invention, it is frequently desirable to connect a plurality of such transmitters to a single circuit with which is also associated a single recorder. The system is operated on a party line basis, only one transmitter being permitted to operate at a time. It then becomes necessary to identify each of the transmitters so that the point of origin of the message may be determined. In order that the subject matter bearing sheets used at all of the transmitting points may be uniform, the station identification may not be incorporated in the sheets. In such a case the station identification may be incorporated in the transmitting apparatus itself.

By having reference to Fig. 3 two typical ways in which this may be done will be explained.

Each subject matter bearing sheet 25 carries a mark such as 126 located definitely with respect to the frame of the subject matter carried by the sheet. In the form chosen for illustration this mark appears over the upper right hand corner of the subject matter frame. In accordance with principles which are well known in the art, the scanning at the transmitting station of the spot 126 generates a synchronizing signal which is utilized at the receiving station to initiate scanning by the recording apparatus. This insures that the recording of the subject matter will be within a predetermined frame.

The station identification such as the letters ABC, designated by the reference character 127, are displayed on the inside surface of the transparent cylinder 41, to which they may be affixed by any suitable means such as a sticker. Since the sheet 25 is inserted in the cylinder at random without regard to the position of the station identification 127, it is possible that, if only one identifying character were used, some or all of it would not coincide with the frame of the subject matter. In this case it would not be properly recorded, and the information desired would be lost. In order to prevent such an occurrence, the station identification is affixed to the transmitting cylinder in a plurality of positions spaced around the periphery thereof. It is thus seen that at least one of the identifying marks will be in register with the frame of the subject matter being transmitted.

The identifying mark such as 127 may be placed in a horizontal space between the synchronizing spot 126 and the frame of the subject matter. However, in order to conserve space on the sheet and also to economize on transmitting time, if suitable arrangements are made at the receiving station, the station identification may be placed in the same horizontal space with the synchronizing mark 126, as indicated by the letters XYZ, designated by the reference character 128. As will be fully explained in a following portion of the specification, the signals generated by the scanning of the identifying characters 128 are ineffective to produce recording marks at the receiving station until scanning has been initiated at the receiver by the transmitter scanning of the synchronizing mark 126.

Having reference now to Fig. 12, the operation of the apparatus will be described in connection with typical control circuits therefor. The apparatus may be connected to a circuit which is individual thereto or it may be connected to a circuit which is also utilized by other similar apparatus on a party line basis. Lines L1 and L2 are connected to the apparatus of transmitting stations A and B and also to a receiving station C. At the transmitting station B, the photoelectric tube 57 is connected through an amplifier 129 and direct current blocking condensers 131 to line conductors L1 and L2. The windings of two three-position polar relays 132 and 133 are connected respectively to line conductors L1 and L2. The windings of relays 132 and 133 are connected in shunt respectively with filter condensers 134 and 135, the purpose of which is to divert the alternating current facsimile signals from the relay windings which are responsive to direct current signaling potentials. Similar apparatus at station A is connected in a like manner to the line conductors.

At the receiving station C the line conductors L1 and L2 are connected permanently to the sleeve and tip respectively of a line jack 136, Also, the line conductor L1 is permanently connected through a direct current blocking condenser 137 to one input terminal of a line amplifier 138. Line conductor L2 is connected through a normal jack contact 139 and a direct current blocking condenser 141 to the other input terminal of the line amplifier. The output terminals of the line amplifier are connected to control a signaling relay 142. When a plug is inserted in the jack 136, the line conductor L2 is disconnected at the normal jack contact 139 from the line amplifier 138. At the same time line conductors L1 and L2 are connected by off-normal jack contacts 143 and 144, respectively, to the arms 145 and 146, respectively, of a manually operable rotary switch 147. The contacts associated with these switch arms are connected in a predetermined manner to positive and negative grounded batteries 148 and 149, respectively. This portion of the receiving station apparatus is substantially similar to that disclosed in detail in Patent No. 2,262,715, granted to Raleigh J. Wise et al. on November 11, 1941, to which reference may be had for a complete disclosure of the apparatus illustrated diagrammatically herein.

A recorder 150, which may be of the type disclosed in Patent No. 2,255,868, granted to Raleigh J. Wise et al. on September 16, 1941, is connected to a plug 151, by means of which and the jack 136 the recorder may be connected to the line conductors L1 and L2.

In describing the operation of the apparatus, it is assumed that the circuit is idle, the transmitting apparatus of station B is not in operation, the jack 136 at the receiving station C is in its normal condition, and the rotary switch 147 is in the position illustrated. The operator at station B, desiring to transmit a message, moves the cover 21 to provide access to the interior of the hollow transparent cylinder 41 and inserts the subject matter bearing sheet 25 in the cylinder in the manner described. The cover is then moved to close the cylinder opening, and the handle 22 is depressed to cause the rod 23 to close contacts 93. Relay 152 is thus operated by means of a circuit which may be traced from the A terminal of a source of alternating current potential 153 over conductor 154, the winding of the relay, contacts 93 and conductors 155 and 156 to the B terminal of the alternating current source. The closure of the inner right hand make contact of relay 152 completes a circuit from the A terminal of the alternating current source 153 over conductors 154, 157 and 158 to the light chopper motor 159, the scanning lamp 52 and the driving motor 46. The other terminals of these devices are connected by conductors 161, 162 and 156 to the B terminal of the alternating current source 153. Thus, the cylinder 41 is rotated, causing the arms 106 to press the sheet 25 against the inside of the cylinder wall, and the signal generating apparatus is put into operation, whereby an alternating current carrier signal is transmitted to the line conductors L1 and L2.

These alternating current signals are received at the receiving station C by the line amplifier 138 and effect the operation of relay 142. The closure of the inner make contact of this relay lights a lamp 163 by an obvious circuit from the positive battery 148. The closure of the outer make contact of this relay connects the positive battery 148 to the line conductor L1.

At station B the armature of relay 132, in response to the positive potential connected to line conductor L1, is moved to its marking contact M. A circuit is thus completed from the A terminal of the alternating current source 153 over conductors 164 and 165, the left hand make contact of relay 152, conductor 166, the winding of the electromagnet 95 and conductors 155 and 156 to the B terminal of the alternating current source. The energization of electromagnet 95 moves the forked member 94 into position over the collar 92 of the handle rod 23, thereby making it unnecessary to hold the handle down manually any longer. Also, the closure of the marking contact of the line relay 132 completes a circuit from the A terminal of the alternating current source over conductor 167, the winding of relay 168, the inner break contact of relay 169 and conductors 171 and 156 to the B terminal of the alternating current source. When relay 168 operates, a locking circuit therefor is completed from the A terminal of the alternating current source over conductors 164 and 172, the make contact of relay 168, conductor 173, the left hand make contact of relay 152, conductor 167, the winding of relay 168, the inner break contact of relay 169, and conductors 171 and 156 to the B terminal of the alternating current source. The closure of the make contact of relay 168 also connects the A terminal of the alternating current source to one terminal of the electromagnet 95. It is seen that, by reason of this locking arrangement, relay 168 is maintained operated and electromagnet 95 is maintained energized independently of the contacts of the line relay 132. Also, as long as the electromagnet 95 is energized with the rod 23 in its depressed position, the contacts 93 are closed to maintain the operation of relay 152.

The lighting of the lamp 163 following the receipt of the alternating current signal indicates to an attendant at the receiving station C that one of the transmitting stations connected to line conductors L1 and L2 desires a connection to a recorder. The plug 151 is inserted in the jack 136 to connect the recorder 150 to the line conductors. At the same time the line conductor L2 is disconnected from the line amplifier to release relay 142 and thereby extinguish the lamp 163 and remove the connection of the positive battery 148 from line conductor L1 by way of the contacts of relay 142. With the rotary switch 147 in the position shown, however, the positive battery is connected by contact 174 and switch arm 145 to line conductor L1 by way of the off-normal jack contact 143.

The apparatus is now in condition to reproduce the message which station B desires to send. The operator at the receiving station C moves the rotary switch 147 so that the arms 145 and 146 are connected respectively to contacts 175 and 176. Positive potential is maintained connected to line conductor L1, and also a similar potential is applied to line conductor L2 by the engagement of switch arm 146 with contact 176 by way of the off-normal jack contact 144.

In response to the positive potential on line conductor L2 the armature of line relay 133 is moved into engagement with its marking contact M'. A circuit is completed and may be traced from the A terminal of the alternating current source 153 over conductor 154, the inner make contact of relay 152, conductors 157 and 177, the marking contact of relay 133, conductor 178, the winding of the half-nut magnet 73 and conductors 161, 162 and 156 to the B terminal of the alternating current source. The half-nut 66 is thus moved into engagement with the feed screw 67 to initiate the downward vertical scanning movement of the carriage 47. The closure of the marking contact M' of line relay 133 also completes a circuit over conductor 179, the Message Being Transmitted lamp 19, conductors 181, 182, 183, 162 and 156 to the B terminal of the alternating current source. The operator at the transmitting station B is thus given an indication that the message is being transmitted to the receiving station C.

The scanning by the transmitting apparatus of the mark 126 generates a synchronizing signal which, when received by the recording apparatus at station C, initiates scanning by the recorder in a well known manner. Every mark appearing on the sheet 25 in register with the frame of the subject matter which is scanned subsequently is recorded at the receiving station. Where the transmitting station identification is carried by the cylinder 41 in the position of the characters 127 (Fig. 3), namely, in a horizontal space below the mark 126, they are recorded at station C in a manner similar to the recording of the subject matter. In this case there are no other marks in the same horizontal space with the mark 126. However, where the transmitting station identification is carried by the cylinder 41 in the position of the characters 128, that is, in the same horizontal space with the mark 126, marking signals are generated in response to the scanning by the transmitter of the marks representing these characters as well as the mark 126. In this case the marking signals representing the characters 128 are of much shorter time duration than the signals representing the mark 126. Since it is undesirable to record marks representing the identifying characters prior to the initiation of scanning by the recording apparatus, it is necessary to adjust the relay or other device responding to the synchronizing signals so that it will not respond to marking signals representing the identification characters but will respond to the signals representing the synchronizing mark 126. Such an adjustment is one which is readily made, one well known expedient being a relay which is slow to operate. If necessary, in order to facilitate such an adjustment, the synchronizing mark 126 may be applied to the sheet so as to occupy a greater length of the horizontal space in which it appears.

At the completion of the transmission of the message, the operator at the receiving station C moves the rotary switch arms 145 and 146 into engagement with contacts 184 and 185, respectively. The positive potential of battery 148 is maintained connected to line conductor L1, and all direct current potentials are disconnected from the line conductor L2.

The disconnection of positive potential from line conductor L2 moves the armature of line relay 133 at the transmitting station B to its midposition, thereby deenergizing the half-nut magnet 73 to permit the carriage 47 to be restored to its upper position and to extinguish the Message Being Transmitted lamp 19.

The attendant at the receiving station C, after inspecting the received copy and finding it unsatisfactory, may make another recording with a different power adjustment by moving the switch arms 145 and 146 again into engagement with contacts 175 and 176, respectively. However, if the received copy is satisfactory, the switch arms 145 and 146 are moved into engagement with contacts 186 and 187, respectively. No potential is connected to line conductor L2, and the positive potential of the battery 148 is disconnected from line conductor L1 and the negative potential of battery 149 is connected thereto.

At the transmitting station B the armature of line relay 132 is moved into engagement with its spacing contact S in response to the negative potential connected to line conductor L1. A circuit is completed from the A terminal of the alternating current source 153 over conductor 164, the spacing contact of relay 132, the winding of relay 169, the outer right hand make contact of relay 152 and conductors 171 and 156 to the B terminal of the alternating current source. Relay 169 is operated and completes a circuit from the A terminal of the alternating current source over conductor 154, the inner right hand make contact of relay 152, the outer make contact of relay 169, the winding of relay 188 and conductors 183, 162 and 156 to the B terminal of the alternating current source. The operation of relay 169 also connects the A terminal of the alternating current source over conductor 189 to one terminal of the Message Received lamp 20, the other terminal of which is connected by conductors 182, 183, 162 and 156 to the B terminal of the alternating current source. As soon as relay 188 is operated, it is locked through its make contact, contacts 99 and conductors 172 and 164 to the A terminal of the alternating current source so that it is maintained operated independently of the contacts of relay 169. Also, the make contact of relay 188 closes a similar circuit to the lamp 20.

The operation of relay 169 also opens at its inner break contact the locking circuit for relay 168 which releases to open its make contact and to thereby deenergize the electromagnet 95. The latter apparatus is somewhat more sluggish in operating and releasing than any of of the other relays and, consequently, introduces a time lag into the release of the transmitting station apparatus. As soon as the forked member 94 is permitted to release the handle rod 23, the contacts 93 are opened to release relay 152. The release of this relay opens, at its right hand make contact, the operating circuit for relay 169 and thereby effects the release of the latter relay. Also the release of relay 152 deenergizes the facsimile transmitting apparatus by the opening of its inner right hand make contact.

The apparatus at the transmitting station B is restored to normal, with the exception of relay 188 and the Message Received lamp 20. Upon noting the illumination of the lamp 20, the operator at this station may open the cover 21 to withdraw the message bearing sheet 25 and, if desired, replace it with a similar sheet for subsequent transmission. Upon opening the cover 21, the contacts 99 controlled by the cam surface 96 are opened to release relay 188 and to extinguish the lamp 20. The apparatus is then completely restored to its normal idle condition.

When apparatus in accordance with the instant invention is connected to a circuit along with other similar apparatus for operation on a party line basis, facilities are provided for preventing all stations except the one in operation from conditioning their transmitting apparatus for operation and also for providing such stations with an indication that the circuit is being used by another station. A description of these facilities will be given on the assumption that the transmitting apparatus 191 at station A is using the line conductors L1 and L2 for communicating with the receiving station C. As soon as positive potential is applied to line conductor L1 by the operation of relay 142 at the receiving station C in response to the reception of a carrier current from the apparatus at station A, line relay 132 at station B and corresponding relays at all other transmitting stations which may be connected to the circuit are actuated to move their armatures to the marking contacts M. A circuit is thus established from the A terminal of the alternating current source 153 over conductor 164, the marking contact of relay 132, conductor 167, the winding of relay 168, the inner break contact of relay 169 and conductors 171 and 156 to the B terminal of the alternating current source. Relay 168 is operated to close its marking contact and connect the A terminal of the alternating current source over conductor 166 to energize the electromagnet 95. Forked member 94 is thus moved into a position to intercept the collar 92 of the handle rod 23 in case the handle 22 is depressed in an attempt to start the transmitting apparatus at this station. Contacts 93 are prevented from being closed so that, as long as this condition exists, it is not possible to operate relay 152, which operation is necessary to start the transmitting apparatus. Also, the closure of the make contact of relay 168 connects the A terminal of the alternating current source 153 over conductor 173 and the left hand break contact of relay 152 to one terminal of the Busy Line lamp 18. Since the other terminal of this lamp is connected by conductors 181, 182, 183, 162 and 156 to the B terminal of the alternating current source, the lamp is lighted to give the operator at station B on indication that the line circuit is in use at another point.

This lock-out condition exists for the duration of the operative engagement of the circuit by the transmitting apparatus 191 of station A by means of the connection of the switch arm 145 at station C with its contacts 174, 175 and 184. Just prior to the release of the circuit, this switch arm is moved into engagement with its contact 186 to connect negative direct current potential to the line conductor L1, thereby opening the marking contact of relay 132 to deenergize relay 168 and the electromagnet 95. The apparatus at station B is thus no longer prevented from being operated, and the Busy Line lamp 18 is extinguished as an indication to the operator at that station that the circuit is now available for use by him, if desired.

The control circuits for the facsimile transmitting apparatus disclosed in Figs. 9 and 10 may be the same as those described. The differences in the functioning of the apparatus are minor ones. In such a case the operation of the handle rod 23 effects the closure of contacts 93' to start the apparatus in the same way as the closure of contacts 93 accomplishes this result. One difference is that, instead of relying upon the rotation of the cylinder 41 to move the centrifugally operated sheet securing members to press the sheet against the inside wall of the cylinder for scanning, as in the modification described, the helical spring member 109 is actuated to its sheet securing position immediately upon the depression of the handle rod 23 before the motor 46 can come up to speed. Similarly, at the end of a scanning operation the sheet securing helical spring is withdrawn from its contact with the sheet before the driving motor for the cylinder is disconnected from its source of power.

The nature of the invention may be ascertained from the foregoing description of two illustrative embodiments thereof, it being understood that changes in the invention herein disclosed may be made within the scope of the appended claims without departing from the spirit of the invention.

What is claimed is:

1. In facsimile scanning apparatus, a sheet supporting member, means for producing a scanning movement of said sheet supporting member and means stationary with respect to said supporting member and normally positioned in spaced relation thereto, said means being positionable by said scanning movement to secure to a sheet to said supporting member for scanning purposes.

2. In facsimile scanning apparatus, a tubular member to support interiorly thereof a sheet for scanning purposes, means for producing a rotative movement of said tubular member, and means operable by said rotative movement to secure a sheet to said tubular member for scanning purposes.

3. In facsimile scanning apparatus, a hollow transparent cylinder to support interiorly thereof a sheet for scanning purposes, means for producing a scanning movement of said cylinder, and means biased toward a centrally disposed position within said cylinder and movable under the control of said scanning movement producing means to press the elemental areas of said sheet against the inside surface of said cylinder.

4. In facsimile scanning apparatus, a rotatable cylinder to support a sheet for scanning purposes, and means operable centrifugally by said cylinder rotation to secure a sheet to said cylinder.

5. In facsimile scanning apparatus, a rotatable hollow transparent cylinder to support interiorly thereof a sheet for scanning purposes, and a plurality of movable members mounted interiorly of said cylinder and biased to be normally spaced therefrom, said members being movable by rotation of said cylinder to press a sheet against the inside surface of said cylinder.

6. In facsimile scanning apparatus, a rotatable hollow transparent cylinder to support interiorly thereof a sheet for scanning purposes, and a plurality of pivoted members biased to be normally free of the inside surface of said cylinder and operable by rotation of said cylinder to press a sheet against the inside surface of said cylinder.

7. In facsimile apparatus, a rotatable hollow transparent cylinder to support interiorly thereof a sheet for scanning purposes, and a plurality of radially spaced pivoted members biased normally toward positions spaced from said cylinder and movable by rotation of said cylinder to positions adjacent said cylinder to press a sheet against the inside surface of said cylinder wall.

8. In facsimile apparatus, a rotatable hollow transparent cylinder to support interiorly thereof a sheet for scanning purposes, and a plurality of radially spaced blades pivoted within said cylinder adjacent the lower end of the inside surface of said cylinder wall so as to be biased at all times to positions spaced from said cylinder wall, said blades being movable by the centrifugal force generated by said cylinder rotation from said biased positions to press a sheet against the inside surface of said cylinder wall.

9. In a facsimile machine, a hollow transparent cylinder to support interiorly thereof a sheet, said cyllinder being open at one end to permit the insertion therein and the removal therefrom of a sheet, means for rotating said cylinder for scanning purposes, a cover movable to close the open end of said cylinder, a handle for said cover and movable relatively thereto, a switch to control said rotating means, means operable by movement of said handle with said cover in cylinder closing position to actuate said switch, means for locking said handle in said switch actuating position during scanning to prevent the opening of said cover, and means operable after scanning for unlocking said handle to permit the removal of said sheet.

10. In facsimile apparatus, a hollow transparent cylinder to support interiorly thereof a sheet for scanning purposes, a cover for said cylinder movable between cylinder opening and cylinder closing positions, a handle pivoted on said cover and carrying an operating member, a shoulder formed on said operating member, means movable to engage either of the faces of said shoulder depending upon whether said engaging means is actuated before or after the operation of said handle with said cover in cylinder closing position, and means controlled by the operation of said handle to actuate said engaging means whereby to lock said handle in its operated position and said cover in its closed position.

11. The invention defined in claim 10, further characterized by means including said engaging means for preventing said operating member from effecting its normal operation and for preventing the locking of said cover in its closed position.

12. In a facsimile transmitter having scanning apparatus, a hollow transparent cylinder for supporting interiorly thereof a sheet bearing subject matter for transmission, means within said cylinder to press said sheet therein against the inside surface of said cylinder wall and subject matter for transmission affixed to said cylinder in overlying relation to said sheet.

13. In a facsimile transmitter having scanning apparatus, a hollow transparent cylinder to support interiorly thereof a sheet having a non-subject matter bearing portion and a subject matter bearing portion for transmission, means within said cylinder for pressing a sheet therein against the inside surface of said cylinder wall and a plurality of identifying characters carried by said cylinder and spaced about the periphery thereof in the zone of a non-subject matter bearing portion of said sheet when a sheet is in position in said cylinder whereby, irrespective of the circumferential positioning of said sheet in said cylinder, a complete identifying character is in position to be scanned in time spaced relation to the scanning of said subject matter bearing portion of the sheet.

RALEIGH J. WISE.
ROBERT D. PARROTT.

REFERENCES CITED

The following references are of record in the file of this patent:

UNITED STATES PATENTS

| Number | Name | Date |
| --- | --- | --- |
| 666,154 | Reed | Jan. 15, 1901 |
| 1,546,992 | Oppman | July 21, 1925 |
| 1,781,689 | Horton | Nov. 18, 1930 |
| 2,182,115 | Carlson | Dec. 5, 1939 |
| 2,201,473 | Carlson | May 21, 1940 |
| 2,255,339 | Thompson | Sept. 9, 1941 |
| 2,255,408 | Carlisle | Sept. 9, 1941 |